US008428617B2

(12) United States Patent
Maher et al.

(10) Patent No.: US 8,428,617 B2
(45) Date of Patent: *Apr. 23, 2013

(54) METHOD AND APPARATUS TO SELECT AN OPTIMUM SITE AND/OR SECTOR TO PROVIDE GEO-LOCATION DATA

(75) Inventors: George Maher, Herndon, VA (US); Ananth Kalenahalli, Ashburn, VA (US); John Carlson, Dulles, VA (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/974,897

(22) Filed: Dec. 21, 2010

(65) Prior Publication Data

US 2011/0092226 A1 Apr. 21, 2011

Related U.S. Application Data

(63) Continuation of application No. 11/802,214, filed on May 21, 2007, now Pat. No. 7,933,610.

(51) Int. Cl.
*H04W 24/00* (2009.01)

(52) U.S. Cl.
USPC ............. 455/456.1; 455/456.2; 455/456.3; 455/456.5; 455/522; 455/436; 455/414.2; 455/404.2

(58) Field of Classification Search ............ 455/456.1, 455/456.2, 456.3, 522, 456.4, 456.5, 456.6, 455/414.2, 404.2
See application file for complete search history.

(56) References Cited

U.S. PATENT DOCUMENTS

| 4,728,959 | A | 3/1988 | Maloney et al. |
| 5,327,144 | A | 7/1994 | Stilp et al. |
| 5,608,410 | A | 3/1997 | Stilp et al. |
| 5,890,068 | A | 3/1999 | Fattouche et al. |
| 5,959,580 | A | 9/1999 | Maloney et al. |
| 6,047,192 | A | 4/2000 | Maloney |
| 6,091,362 | A | 7/2000 | Stilp |
| 6,097,336 | A | 8/2000 | Stilp |
| 6,101,178 | A | 8/2000 | Beal |
| 6,108,555 | A | 8/2000 | Maloney et al. |
| 6,115,599 | A | 9/2000 | Stilp |
| 6,119,013 | A | 9/2000 | Maloney et al. |

(Continued)

FOREIGN PATENT DOCUMENTS

WO 2006088472 A1 8/2006

OTHER PUBLICATIONS

International Searching Authority, International Search report for related International Application No. PCT/US2008/060113, mailed Jun. 30, 2008, p. 1-3.

*Primary Examiner* — Kamran Afshar
*Assistant Examiner* — Khalid Shaheed
(74) *Attorney, Agent, or Firm* — Duane Morris LLP

(57) ABSTRACT

A system and method selects secondary base stations to task that provide geo-location information used to geo-locate a mobile station. A network overlay location system may be co-located at base station sites of a wireless communications network. The location measurement units of the network overlay system provide location information of the mobile station, which may be determined via one or more geo-location techniques, for example: time of arrival (TOA), time difference of arrival (TDOA), uplink time difference of arrival (UTDOA), angle of arrival (AOA), signal power, radio fingerprinting etc. Selecting secondary base stations to task using various selection criteria may provide optimum results when geo-locating a mobile station.

18 Claims, 10 Drawing Sheets

U.S. PATENT DOCUMENTS

| Patent/Publication | Kind | Date | Inventor(s) | Class |
|---|---|---|---|---|
| 6,127,975 | A | 10/2000 | Maloney | |
| 6,172,644 | B1 | 1/2001 | Stilp | |
| 6,184,829 | B1 | 2/2001 | Stilp | |
| 6,266,013 | B1 | 7/2001 | Stilp et al. | |
| 6,281,834 | B1 | 8/2001 | Stilp | |
| 6,285,321 | B1 | 9/2001 | Stilp et al. | |
| 6,288,675 | B1 | 9/2001 | Maloney | |
| 6,288,676 | B1 | 9/2001 | Maloney | |
| 6,317,081 | B1 | 11/2001 | Stilp | |
| 6,317,604 | B1 | 11/2001 | Kovach, Jr. et al. | |
| 6,334,059 | B1 | 12/2001 | Stilp et al. | |
| 6,351,235 | B1 | 2/2002 | Stilp | |
| 6,366,241 | B2 | 4/2002 | Pack et al. | |
| 6,388,618 | B1 | 5/2002 | Stilp et al. | |
| 6,400,320 | B1 | 6/2002 | Stilp et al. | |
| 6,463,290 | B1 | 10/2002 | Stilp et al. | |
| 6,483,460 | B2 | 11/2002 | Stilp et al. | |
| 6,492,944 | B1 | 12/2002 | Stilp | |
| 6,519,465 | B2 | 2/2003 | Stilp et al. | |
| 6,546,256 | B1 | 4/2003 | Maloney et al. | |
| 6,563,460 | B2 | 5/2003 | Stilp et al. | |
| 6,603,428 | B2 | 8/2003 | Stilp | |
| 6,646,604 | B2 | 11/2003 | Anderson | |
| 6,661,379 | B2 | 12/2003 | Stilp et al. | |
| 6,765,531 | B2 | 7/2004 | Anderson | |
| 6,771,625 | B1 | 8/2004 | Beal | |
| 6,782,264 | B2 | 8/2004 | Anderson | |
| 6,873,290 | B2 | 3/2005 | Anderson et al. | |
| 6,876,859 | B2 | 4/2005 | Anderson et al. | |
| 6,973,298 | B2 | 12/2005 | Chang et al. | |
| 6,996,392 | B2 | 2/2006 | Anderson et al. | |
| 7,023,383 | B2 | 4/2006 | Stilp et al. | |
| 7,167,713 | B2 | 1/2007 | Anderson | |
| 7,271,765 | B2 | 9/2007 | Stilp et al. | |
| 7,340,259 | B2 | 3/2008 | Maloney et al. | |
| 7,427,952 | B2 | 9/2008 | Bull et al. | |
| 7,440,762 | B2 | 10/2008 | Maloney et al. | |
| 7,593,738 | B2 | 9/2009 | Anderson | |
| 2002/0094824 | A1 | 7/2002 | Kennedy, Jr. et al. | |
| 2002/0172223 | A1 | 11/2002 | Stilp | |
| 2003/0064734 | A1 | 4/2003 | Stilp et al. | |
| 2005/0227703 | A1 | 10/2005 | Cheng | |
| 2006/0003775 | A1 | 1/2006 | Bull et al. | |
| 2006/0030333 | A1* | 2/2006 | Ward et al. | 455/456.1 |
| 2006/0105776 | A1 | 5/2006 | Burke | |
| 2006/0114336 | A1 | 6/2006 | Liu | |
| 2006/0116130 | A1 | 6/2006 | Kennedy, Jr. et al. | |
| 2006/0194594 | A1* | 8/2006 | Ruutu et al. | 455/456.5 |
| 2006/0262731 | A1 | 11/2006 | Carlson et al. | |
| 2007/0042790 | A1 | 2/2007 | Mohi et al. | |
| 2007/0111746 | A1* | 5/2007 | Anderson | 455/522 |
| 2007/0117573 | A1* | 5/2007 | Kennedy et al. | 455/456.1 |
| 2007/0155401 | A1 | 7/2007 | Ward et al. | |
| 2007/0155489 | A1 | 7/2007 | Beckley et al. | |
| 2008/0132244 | A1 | 6/2008 | Anderson | |
| 2008/0132247 | A1 | 6/2008 | Anderson | |
| 2008/0137524 | A1 | 6/2008 | Anderson et al. | |
| 2008/0158059 | A1 | 7/2008 | Bull et al. | |
| 2008/0160952 | A1 | 7/2008 | Bull et al. | |
| 2008/0160953 | A1 | 7/2008 | Mia et al. | |
| 2008/0161015 | A1 | 7/2008 | Maloney et al. | |
| 2008/0248811 | A1 | 10/2008 | Maloney et al. | |
| 2008/0261611 | A1 | 10/2008 | Mia et al. | |
| 2008/0261612 | A1 | 10/2008 | Mia et al. | |
| 2008/0261613 | A1 | 10/2008 | Anderson et al. | |
| 2008/0261614 | A1* | 10/2008 | Mia et al. | 455/456.1 |
| 2009/0005061 | A1 | 1/2009 | Ward et al. | |

* cited by examiner

METHOD AND APPARATUS TO SELECT AN OPTIMUM SITE AND/OR SECTOR TO PROVIDE GEO-LOCATION DATA

This application is a continuation application of U.S. patent application Ser. No. 11/802,214 filed May 21, 2007 now U.S. Pat. No. 7,933,610 entitled "Method and Apparatus to Select an Optimum Site and/or Sector to Provide Geo-Location Data". The entire disclosure is incorporated herein by reference.

BACKGROUND

The use of wireless communication devices such as telephones, pagers, personal digital assistants, laptop computers, etc., hereinafter referred to collectively as "mobile appliances" or "mobiles stations" has become prevalent in today's society. In recent years, at the urging of public safety groups, there has been increased interest in technology which can determine the geographic position or "geo-locate" a mobile station in certain circumstances.

In the United States, mobile station locating equipment is being deployed for the purpose of locating wireless callers who dial 911. Other services in addition to emergency call servicing are contemplated and are referred to as location based services (LBS). Wireless location equipment is typically employed as an overlay to wireless communication networks, thus forming a network overlay geo-location system.

FIG. 1 illustrates a wireless communications network (1), which typically includes a plurality of base stations (BS) 10a, 10b, 10c and 10d (10(a-d)) a mobile station (MS) 20, and a mobile switching center (MSC) 30, also known as a base station controller (BSC). The wireless communication network allows communication between the MS and the BS over an air interface as is well known in the art.

The network overlay geo-location system is designed to work with the wireless communications network, and is made up of a plurality of local measurement units (LMU) 15, also known as wireless location sensors (WLS), a geo-location system controller (GCS) 35, also known as a serving mobile location center (SMLC) and a mobile positioning center (MPC) 45, also known as a gateway mobile location center (GMLC).

The LMUs 15 of the geo-location network overlay system are generally co-located at the wireless service provider BSs 10(a-d). The LMUs 15 conduct measurements on radio signal emitted by the MS 20 under control of the GCS 35. The GCS 35 is commanded by the MPC 45 to determine and report locations of specific MSs 20.

The GCS 35 is responsible for processing sensor information gathered from the LMUs 15. A database 55 stores the collected sensor information which is accessible by the GCS 35. When a location request is received, the mobile network provider will notify the GCS 35 as to which BS10(a-d) and/or respective BS sector (not shown) is serving a current call of a MS 20.

Most network overlay systems include a number of non-serving BS sites 10(b-d) located around the vicinity of the serving BS site 10(a), which are termed "secondary sites" and the corresponding sectors of the secondary sites are called "secondary sectors" (not shown). For this example, the secondary sites 10(b-d) are the sites located furthest from the MS 20, and the serving site 10(a) is located closest to the MS 20. The LMUs 15 co-located with the secondary sites 10(b-d) return location measurement information that enables the GCS 35 to compute the location of a caller/MS 20.

In operation, network overlay systems conduct measurements of radio frequency (RF) transmissions from the MS 20 and received by BSs 10(a-d), and estimate the location of the MS 20. The geographic location of the BSs 10(a-d) are known, and the location of the MS 20 with respect to the BSs 10(a-d) is represented by a reference position location which is an estimated location of the MS 20 that enables the geographic location of the MS 20 to be determined.

To geo-locate MS 20, one or more of the BSs 10(a-d) perform radio frequency measurements on the received signals transmitted from MS 20. Some techniques used to perform geo-location from signal measurements can include, for example: time of arrival (TOA), time difference of arrival (TDOA), uplink time difference of arrival (UTDOA), the angle of arrival (AOA), the signal power, or the unique/repeatable radio propagation path (radio fingerprinting). In addition, the geo-location systems can also use collateral information (e.g., locations of roads, dead-reckoning, topography, map matching etc.) to assist in geo-locating the MS 20.

UTDOA is a network-based geo-location algorithm that determines a MS's 20 position by calculating the difference in time required for a MS's 20 signal to arrive at different BSs 10(a-d). The arrival time measurements are performed by the LMUs 15 installed at selected BSs 10(a-d). UTDOA requires the target MS's 20 signal be measured by at least three LMUs 15. These measurements are sent to the GCS 35, which computes the location of the target MS 20 using the time difference of arrival of the RF signal transmitted from the MS 20 to the BSs 10(a-d).

AOA is another network-based geo-location algorithm that determines the MS's 20 position by establishing lines of bearing from the BSs 10(a-d) to the MS 20. AOA requires the installation of a LMU 15 at each AOA-equipped BS, and also requires direction-sensing antennas. The AOA algorithm searches for the target MS 20 on a serving sector of a serving BS10a, and on secondary sectors of secondary sites 10(b-d). The likelihood of obtaining an accurate location of the MS 20 using the AOA algorithm depends to a large extent on the correct choice of secondary sectors for the secondary sites 10(b-d). AOA is normally deployed in especially challenging geographic circumstances. For example, AOA is sometimes used in mountainous areas with sparse BS installations and challenging BS site-to-site geometry.

In addition to optimum selection of LMUs 15 at secondary site locations, it is important to have optimum LMU 15 coverage of the MS 20. Optimum coverage, or "good coverage", illustrated in FIG. 1, would be realized by LMUs 15 surrounding the MS 20 from all sides and being physically close enough to receive accurate signal timing measurements. Geo-location accuracy can suffer from geometric dilution of precision, or "poor coverage" when the sensors are all located in roughly the same area and direction with respect to the MS 20, as illustrated in FIG. 2. Selecting a reference position as an estimated location of the MS 20 prior to selecting a secondary base station to task may provide optimum secondary site selection.

In one embodiment of applicant's disclosure, it may be desirable to select a secondary BS site to task by determining a reference position within the geographical area of the serving sector before selecting a secondary BS site. In another embodiment of applicant's disclosure, it may be desirable to select a secondary BS site to task by determining a reference position to be the location of the serving BS site. In yet another embodiment of applicant's disclosure, it may be desirable to select a secondary BS site to task based on a function of the reference position. In still another embodiment of applicant's disclosure, it may be desirable to select a secondary BS site to task based on a preferred parameter that cannot be produced by the other secondary sites.

In another embodiment of applicant's disclosure, it may be desirable to select a secondary BS site to task by computing a distance range to one or more secondary sites, omitting the secondary sites outside the distance range as potential secondary site candidates, computing the bearing angle from at least one secondary site to the reference position, determining which secondary sites do not have at least one sector beam that covers the reference position, omitting the secondary sites that do not have at least one sector beam that covers the reference position as potential secondary site candidates, and flagging the secondary site that is closest to the mobile station reference position as a selected secondary site.

Accurate geo-location performance is predicated on optimum selection and tasking of LMUs 15 at secondary sites 10(*a-d*) and their respective sectors. Optimum secondary site and/or secondary sector selection may provide superior geo-location performance results. Enabling the GCS 35 to select and task optimum secondary sites and/or secondary sectors may provide geo-location information necessary to estimate the location of the MS 20.

These and other advantages of the disclosed subject matter over the prior art will be readily apparent to one skilled in the art to which the disclosure pertains from a perusal of the claims, the appended drawings, and the following detailed description of the preferred embodiments.

DETAILED DESCRIPTION

A network overlay geo-location system is described herein that utilizes one or more algorithms to select secondary base station (BS) sites and/or secondary BS site sectors to task in order to obtain optimum geo-location information. The secondary sites are BS sites other than the serving BS site of a mobile station (MS). The location of the secondary sites is an important consideration when selecting secondary sites to task in order to geo-locate the MS. The geo-location information obtained by secondary sites may provide the network overlay geo-location system with the capability to geo-locate a MS operating within a mobile communications network.

Some examples of conventional geo-location methods include AOA, TDOA, UTDOA etc., and may include other methods not specifically described in this detailed description. The accuracy of the information used for geo-location is important to the success of locating a MS. Algorithms can be used to determine optimum secondary sites and/or sectors to task to provide geo-location measurement information to locate the MS. The secondary sites may be selected with respect to a mobile station reference position located generally within the communication area of the serving site.

Geo-location of a MS, in accordance with one or more embodiments described herein, can be divided into three parts. First, the MS reference position is selected as the estimated location of the MS within the communication area of the serving site. Second, the secondary site(s) and their respective sector(s) are selected to provide optimum geo-location information based on their relative locations and positions with respect to the MS reference position. Third, the secondary sectors of the selected secondary sites are tasked to obtain and provide the geo-location information of the MS to the GCS so the estimated location of the MS may be calculated.

Figure 5:
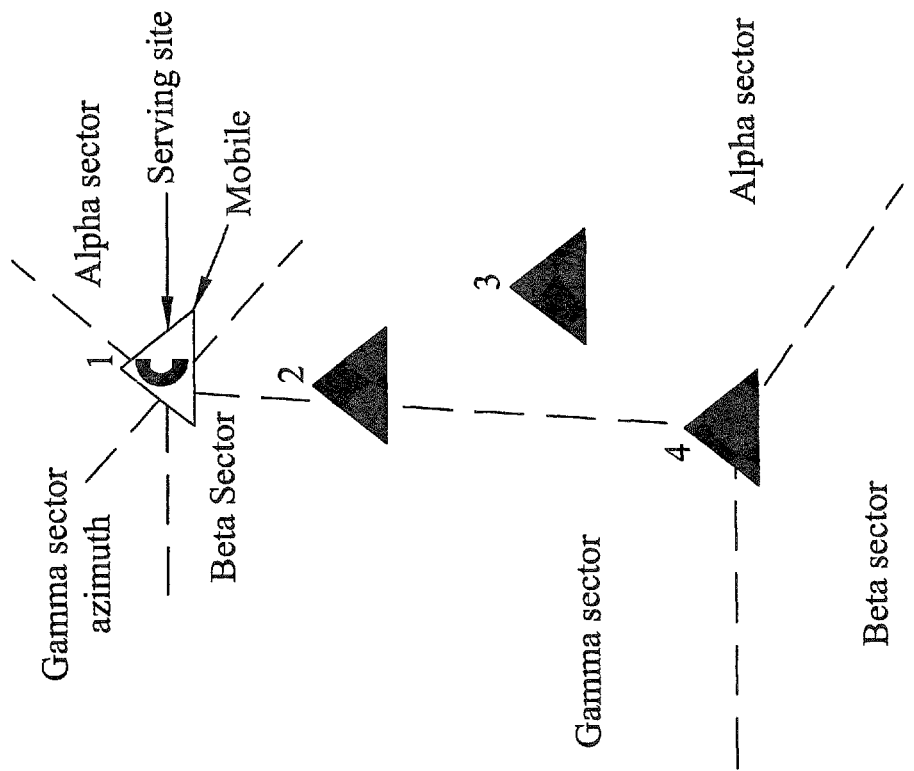
FIG. 5 illustrates a wireless communications network where the reference position is selected to be the location of the serving site.

The reference position of the MS may be selected a number of different ways. One option is to designate the location of the serving site as the MS reference position, as illustrated in FIG. 5. Once the serving site of the MS is known, it can be assumed that the MS is located within the communication range of the serving site. Therefore, the location of the serving site serves as an estimate of the MS's position regardless of the actual position of the MS. It is not necessary to know the serving sector of the serving site when designating the serving site as the MS reference position.

Figure 1:
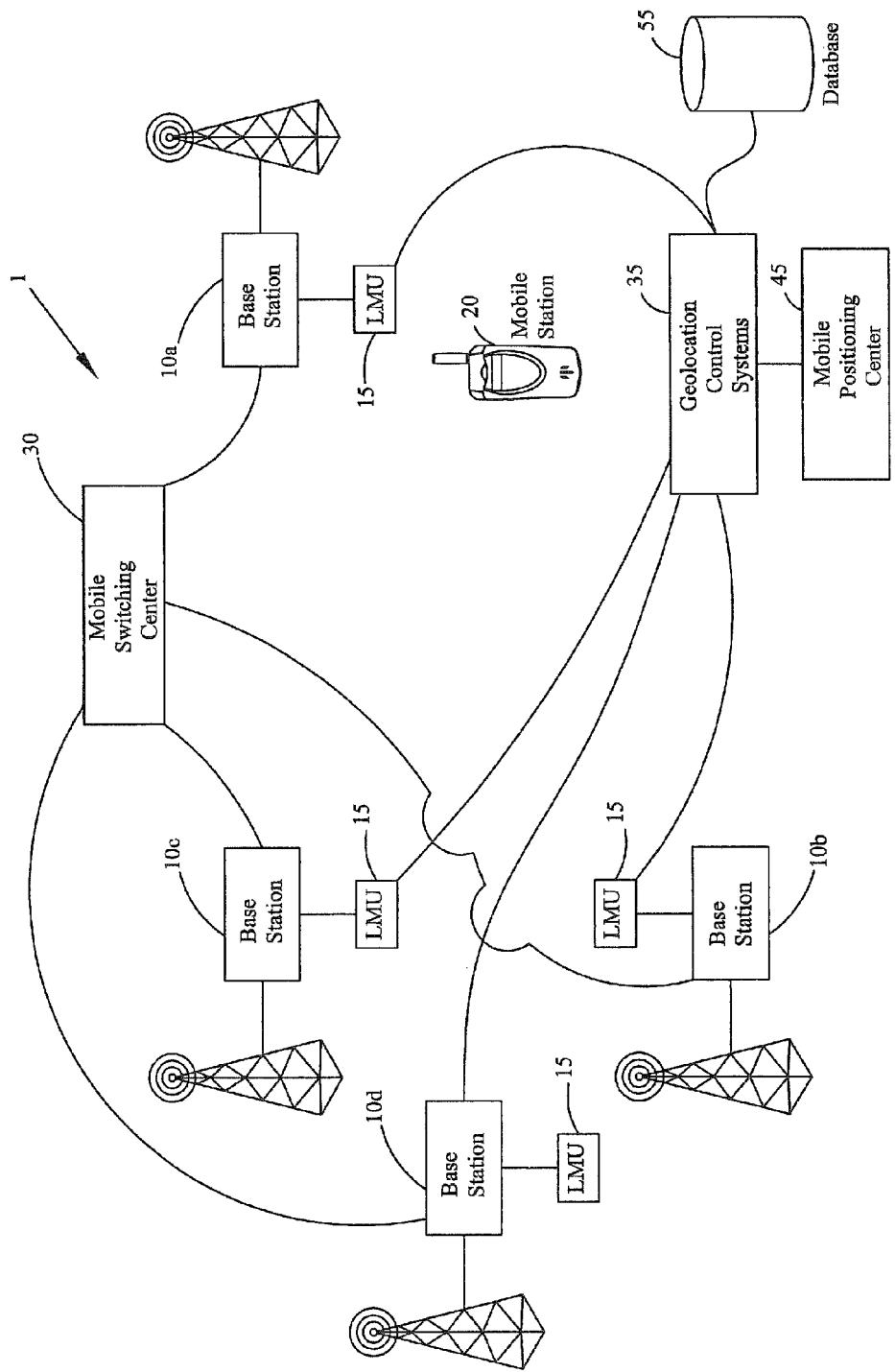
FIG. 1 illustrates a wireless communications network and network overlay system.
Figure 2:
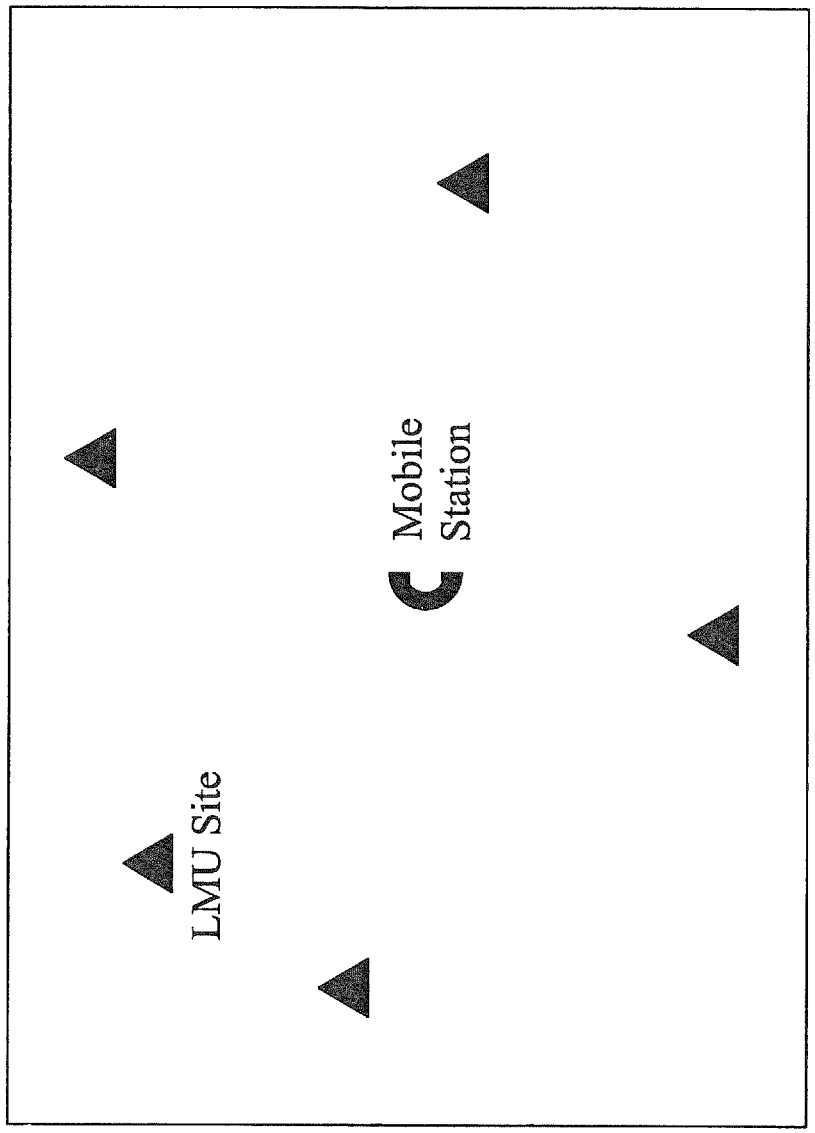
FIG. 2 illustrates optimum LMU coverage of a MS in a wireless communications network environment.
Figure 3:
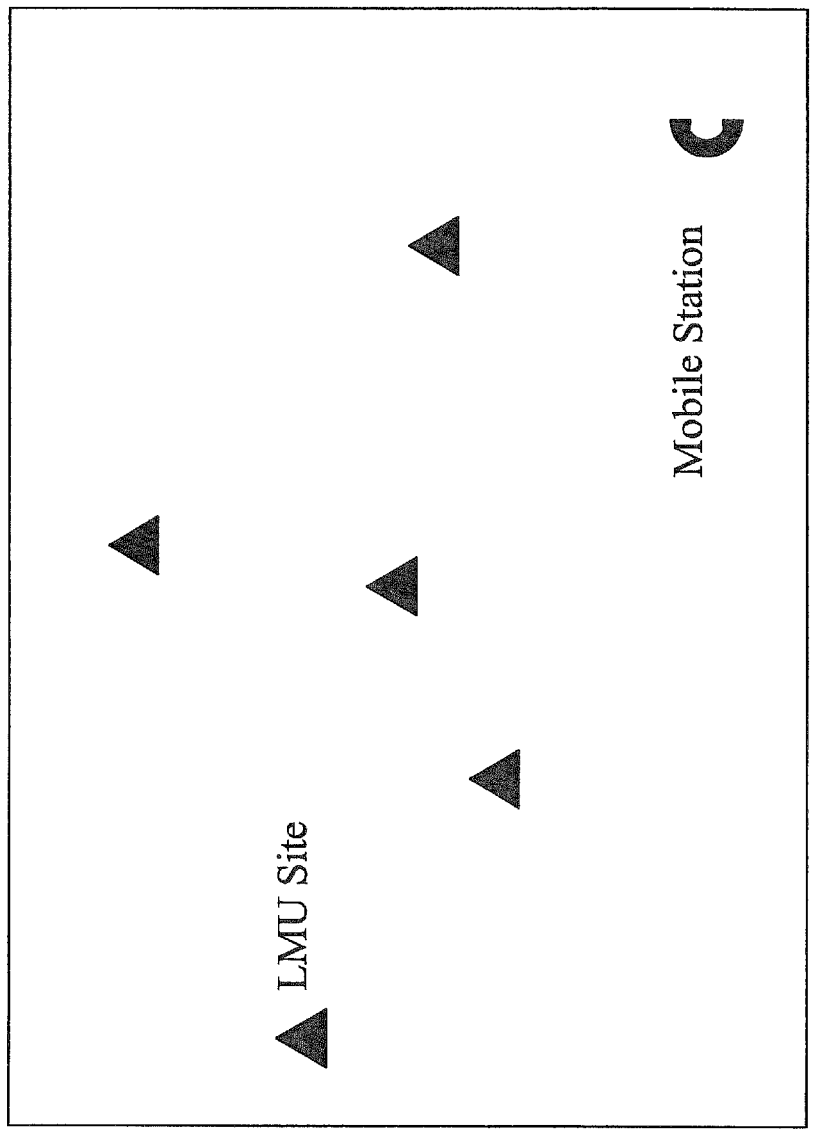
FIG. 3 illustrates poor LMU coverage of a MS in a wireless communications network environment.
Figure 4:
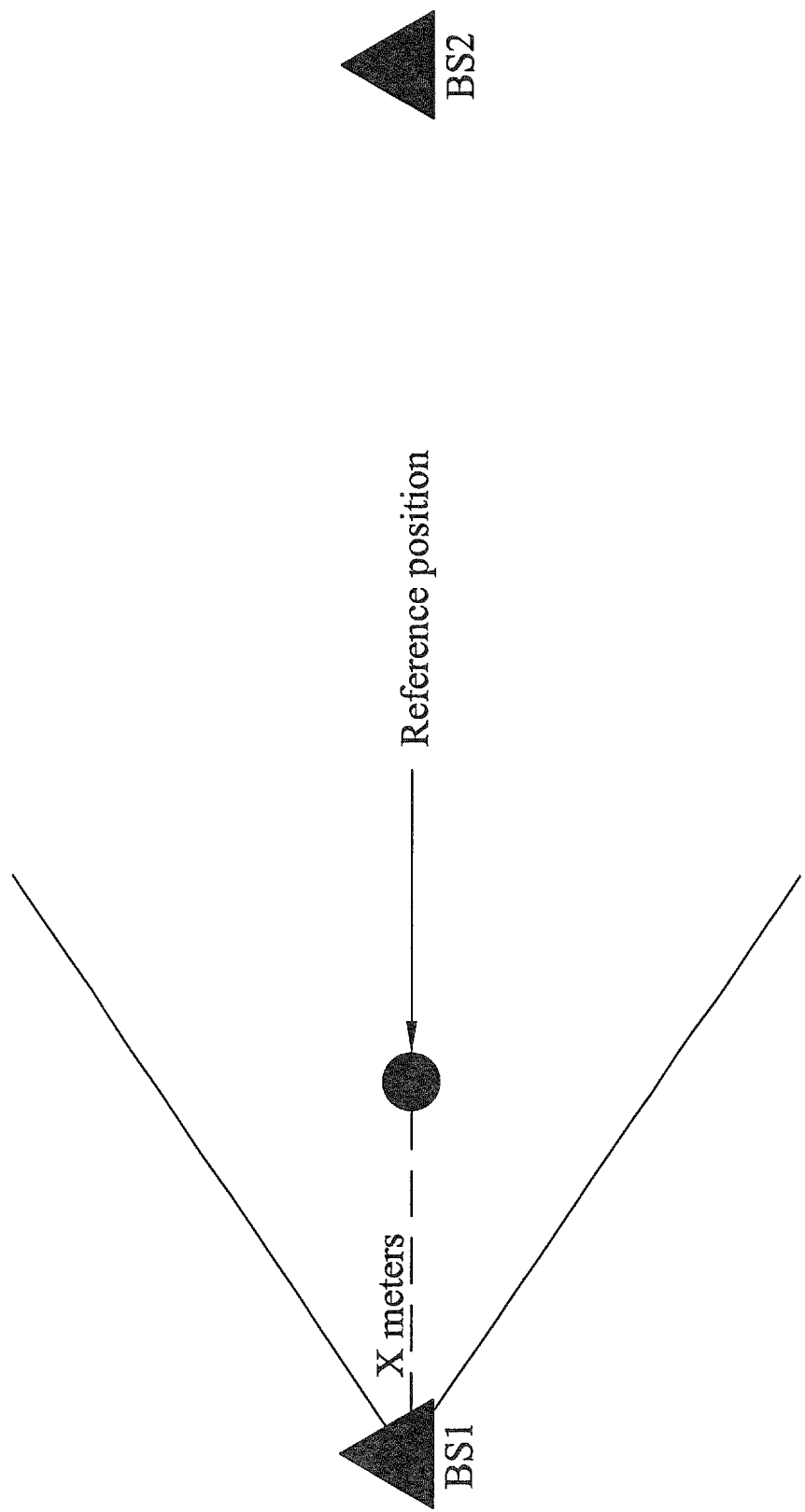
FIG. 4 illustrates a reference position selected as a function of inter-site distance.

Another option is to designate the reference position a predetermined distance away from the serving site location. FIG. 4 illustrates an example of a reference position located "X" meters on a heading of the serving sector of the serving site BS1. Referring to FIG. 4, a two-site configuration is illustrated having a reference position (denoted by the circle) located X meters from the serving site BS1. The serving sector should be known before the reference position can be designated on a heading of the serving site BS1.

FIG. 4 illustrates the reference position X located closer to BS1 than BS2, and inside the serving sector of the serving site BS1. The reference position represents an estimated position for the MS, which is operating within the coverage area of its serving sector. In this example, the reference position is designated as twenty percent of the average inter-site distance on the heading of the serving sector. The average inter-site distance is defined as the average of the distances from the closest site to each of the sites in a given PSAP (Public Safety Access Position) boundary.

In the example shown in FIG. 4, the reference position is selected to be approximately twenty percent of the inter-site distance. Other percentages of the inter-site distance may be used to estimate the location of the MS. The dotted line along the center of BS1's sector coverage indicates its heading. The lines drawn on both sides of the heading of BS1 show the edge of coverage of its serving sector. In FIG. 4, the mobile reference position is shown to be X meters on the heading of the serving sector, where X is twenty percent of the distance between BS1 and BS2.

The reference position selected as a function of inter-site distance, as illustrated in FIG. 4, may prove to be more accurate when used in a secondary site and/or secondary sector selection algorithm as opposed to having BS1 as the reference position. For example, if BS1 and BS2 were farther apart than what is shown in the FIG. 4, then the reference position selected as a function of twenty percent the inter-site distance, would move further into the serving sector of BS1. Having the reference position selected as a function of inter-site distance provides a dynamic approach to accurately selecting secondary sites and sectors to task. The MS reference position can be calculated using a variety of other different methods not described herein for convenience.

Implementing an adjustable MS reference position provides a way to estimate the location of the MS as a function of site and/or sector location. Both of the MS reference position examples discussed above have proven to be useful ways to estimate the location of the MS for geo-location purposes. Certain factors, such as, secondary site/sector geometry, serving site/sector location and other factors play a role in selecting which reference position determination technique to use.

Once the reference position is selected, the secondary site(s) and/or sector(s) can be selected and tasked to provide geo-location information to locate the MS. Secondary site selection can be accomplished a number of different ways. Regardless of what type of analysis is done to select secondary sites, the selected reference position provides a starting position to determine which secondary sites are in a position to provide optimum geo-location information.

One way to select secondary sites is to compute the distance range to the available LMUs co-located at BSs (i.e., potential secondary sites) from the MS reference position. Once the distances between the secondary sites and the reference position are known, the BSs whose distance from the reference position exceeds a predetermined distance threshold can be omitted. The predetermined distance threshold may be based on a known practical coverage distance capable of receiving accurate geo-location information. The predetermined distance may also be adjustable to accommodate different types of networks or geographical areas etc.

To further limit the list of potential secondary site candidates, further calculations may be necessary. For example, it may be useful to calculate the bearing angle from the remaining secondary BS candidates to the MS reference position (i.e., 180 degrees minus the bearing angle from the MS to the secondary BS) for each secondary site candidate, and check if the MS is within any sector beam of the secondary BS. If the MS is not within any sector beam of the secondary sites, then those secondary sites may be omitted as possible secondary site candidates. Calculating the bearing angle of the secondary sites is done to avoid tasking any secondary sites having sectorized antenna beams outside the location of the reference position. For example, when a site does not have 360 degree antenna coverage its antenna coverage may not include the reference position, in which case it may be omitted from the list of potential secondary site candidates.

An additional secondary site selection criteria may include selecting the secondary site that is closest to the MS reference position as a selected site. The selection of the closest site may be performed first, or after one or more of the distance range and the bearing angle position tests are performed, as described above. Once the secondary site that is closest to the MS reference position is determined, the site can be flagged so it is no longer considered to be an available secondary site candidate.

Once a potential secondary site candidate is selected, a new look direction $B_L$ can be calculated based on the previously selected secondary site. The look direction $B_L$ is calculated by determining the bearing angle from the MS reference position to the previously selected secondary site, and adding 180 degrees to the computed bearing angle. The new look direction $B_L$ can act as a directional guide when selecting subsequent secondary sites. For example, once a given area is covered by a selected secondary site, it would be prudent to select a secondary site and/or sector located outside the general coverage area of the previously selected secondary site.

An additional secondary site selection criteria may include computing a cost function for one or more of the candidate secondary sites. The cost function may be calculated for those candidate sites that remain after one or more of the distance range, bearing angle position and/or the closest site tests are performed. The cost function may be a function of the distance from the MS reference position to the secondary site candidate, and the site's azimuth bearing angle difference from the look direction bearing angle. The cost function is the sum of the distance cost component and the bearing (angular) cost component:

$$COST = COST_{Distance} + COST_{Bearing}$$

The bearing cost is defined as the absolute value of the angular difference in degrees between the bearing angle, from the MS reference position to the secondary site candidate, and the look direction bearing angle:

$$COST_{Bearing} = |B_L - B_{MS\_BS}|$$

The distance cost may be computed in different ways depending on the distance from the MS reference position to the secondary site candidate. Two different distance functions may be used so that candidate sites that are very close to the MS reference position are more likely to be chosen than would be the case with a single distance cost function. For sites that are inside a configurable distance cutoff ($D_{cutoff}$) radius from the MS reference position, the distance cost is:

$$COST_{Distance} = = W(D_{MS\_BS}^F)$$

where $D_{MS\_BS}$ is the distance from the MS reference position to the candidate site in kilometers, F is an exponent that controls how steep the distance cost penalty increases inside the cutoff radius, and W is a weighting factor that controls the relative cost between distance and bearing angle costs.

For sites outside the distance cutoff radius, the distance cost function increases linearly with distance and is equal to:

$$COST_{Distance} = = WD_{MS\_BS} + C$$

where the constant term (C) is equal to the distance cost evaluated at the distance cutoff radius. The constant term is necessary so that the overall distance cost is monotonically increasing with distance.

Once the cost function has been calculated, the secondary site candidate with the minimum total cost is selected and can be flagged so it is no longer considered to be an available secondary site candidate.

Once a new secondary site is selected a new look direction bearing angle ($B_L$) can be selected. The new look direction $B_L$ can be calculated to bisect the largest uncovered sector (i.e. largest "pie slice" between secondary sites), as described below. First, the bearing angles from the MS reference position to the flagged secondary sites should be listed in ascending order. Next, the difference between adjacent bearing angles is calculated, and the largest difference is selected. The look direction $B_L$ is measured in the direction that bisects the selected difference. Once the new look direction is calculated, the cost function calculation for the remaining secondary site candidates may be repeated. The process of calculating a new look direction and computing a cost function is recursive and may be repeated until the desired number of secondary sites have been selected, or no candidates remain. If for a particular look direction there are no secondary site candidates located in the uncovered sector, this look direction can be skipped and the next largest uncovered sector may be selected to obtain the new look direction.

As the secondary site selection algorithm proceeds, a situation may occur in which a secondary site candidate would be selected that is "geometrically redundant" with a previously chosen secondary site (i.e., it is in roughly the same direction as a previously chosen site but farther away). To prevent selection of geometrically redundant secondary sites, a bearing angle "buffer zone" may be defined around each previously selected secondary site such that no new secondary sites may be chosen if they are within +/−N degrees (typically 5 degrees) of the bearing angle from the secondary site to the MS reference position.

After the secondary sites and their respective sectors have been selected and identified as candidates for providing geolocation information, the optimum sectors of the selected sites can be tasked to obtain and provide the geo-location information of the MS to the GCS.

FIG. 5 illustrates a configuration of four BSs labeled BS1, BS2, BS3 and BS4, where BS1 is the serving site and BS2-BS4 represent secondary sites. The three lines extending from BS1 represent the edges of coverage for its respective alpha, beta and gamma sectors. The shorter line in the center of the gamma sector of BS1 represents the heading of the gamma sector. The configuration illustrated in FIG. 5 can be classified as "poor geometry" since the x-coordinates of BS1-BS4 are close together. If either the x or the y coordinates of the BSs are close together, it is evident that the sites are located in a straight line, which indicates poor geometry.

As stated previously, an AOA geo-location configuration may be used to geo-locate a MS. An AOA geo-location configuration may include AOA antennas at each sector having approximately 120 degree coverage per sector. It is important that the correct sector of an AOA configuration is selected to be tasked or the AOA measurements may be inaccurate.

In TDOA geo-location systems, poor geometry can be characterized as horizontal dilution of precision (HDOP). If, however, the sensors of the LMUs co-located at the secondary sites surround the target MS from all sides, the coverage is considered good and dilution of precision is low.

The average inter-site distance is another factor that could directly affect the accuracy of geo-location information provided by secondary sites. For example, as the average inter-site distance increases, the GCS has to determine which sectors of secondary stations to task.

In one mode of operation, the GCS uses the serving site location as the MS reference position and selects one or more of the secondary sectors of the respective secondary sites enclosing the reference position as the sector(s)-to-task. For example, referring to FIG. 5, BS1 is mostly enclosed by the alpha sector of BS4, so the GCS may decide to task the alpha sector of BS4. Following this approach to tasking secondary sectors, the GCS considers the available secondary sensor LMU sites co-located at the secondary sites and comes up with a list of sectors to task for the available secondary sites. Note that when the serving site acts as the reference position, the GCS is not required to know the serving site's serving sector when deciding which secondary sectors to task.

The above described method would most likely operate successfully if the mobile was indeed located geographically somewhere on the serving sector (alpha sector) of BS1. If, however, the MS was actually located geographically on the gamma sector of BS1, then the GCS would still select to task the alpha sector of BS4 because the reference position is BS1, which is located in the alpha sector of BS4.

The AOA algorithm will search for the target within +/−60 degrees of the tasked sector heading. For the above example, the algorithm will search for the mobile on the alpha sector. Since that is the wrong sector, the directional antennas may receive the target MS's signal at a reduced level, if at all. As a result, the accuracy of the AOA algorithm will be degraded, which results in the final estimated location of the MS to be inaccurate.

In another mode of operation of one or more of the embodiments described herein, the fact that the GCS can obtain knowledge of the serving sector is exploited when it attempts to select optimum secondary sectors to task. Instead of using the serving site location as the location of the MS reference position, the GCS puts out the MS reference position "X" meters on the heading of the serving sector and uses this location to find the secondary sectors to task.

Figure 6:
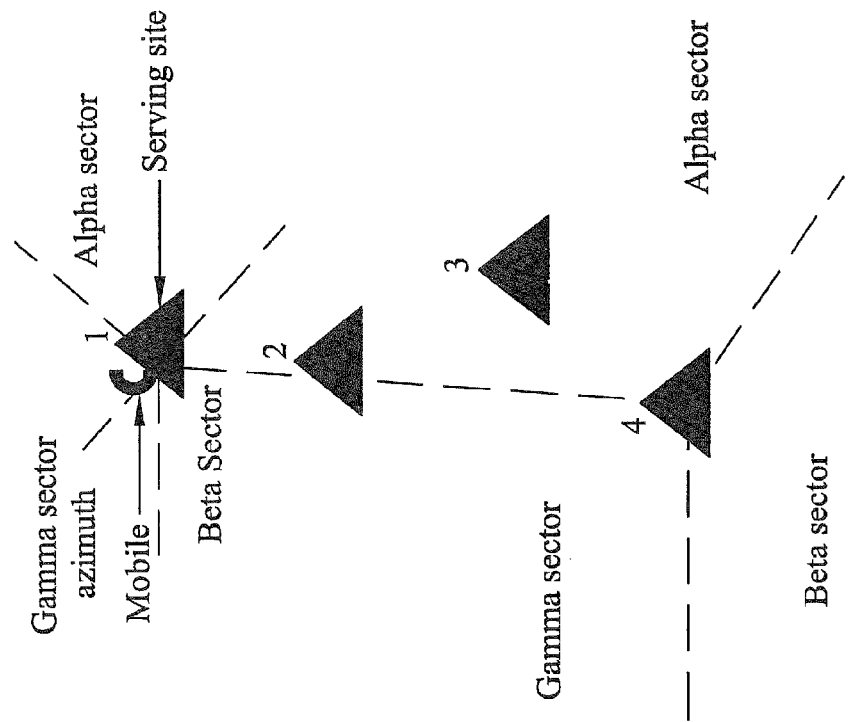
FIG. 6 illustrates a wireless communications network where the reference position is selected to be outside the location of the serving site.

Consider the above-mentioned scenario where the MS is located geographically on and is served by the gamma sector of BS1, as illustrated in FIG. 6. The GCS in this example operates as though the MS reference position is located "X" meters on the heading of the serving sector. The network in FIG. 6 illustrates the location of the MS reference position is part of the gamma sector of BS4, so the GCS may select the gamma sector as the sector-to-task for secondary BS4. Placing the MS reference position "X" meters on the heading of the serving sector provides the correct sector selection of the secondary sites. In the above example, the GCS was able to select a secondary sector better suited to provide accurate geo-location information.

Figure 7:
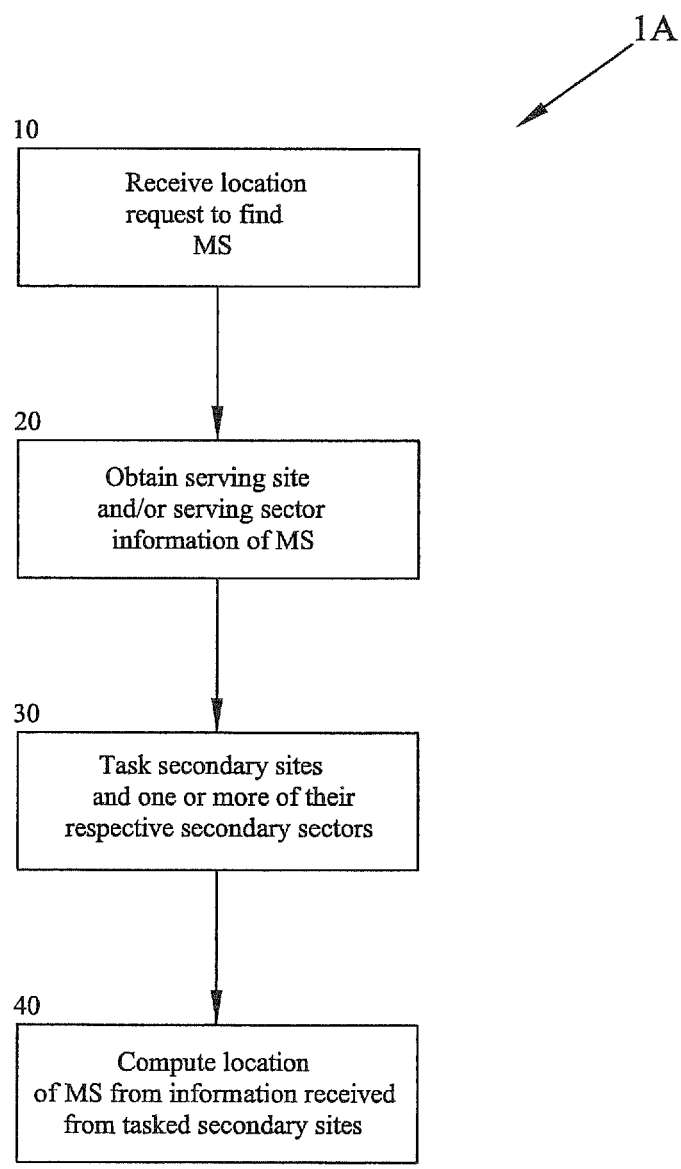
FIG. 7 illustrates a flow diagram of a process to geo-locate a MS.

FIG. 7 illustrates a flow diagram (1A) of a process to geo-locate a MS. Initially, a location request to geo-locate a MS is received at one or more BSs and/or the GCS of the mobile communications network (operation 10). The GCS, for example, may then determine the serving site and/or the serving sector of the MS (operation 20). The secondary sites can then be tasked to provide location information location, which may be used to geo-locate the MS (operation 30). The location information is computed by the GCS to determine the location of the MS (operation 40).

Figure 8:
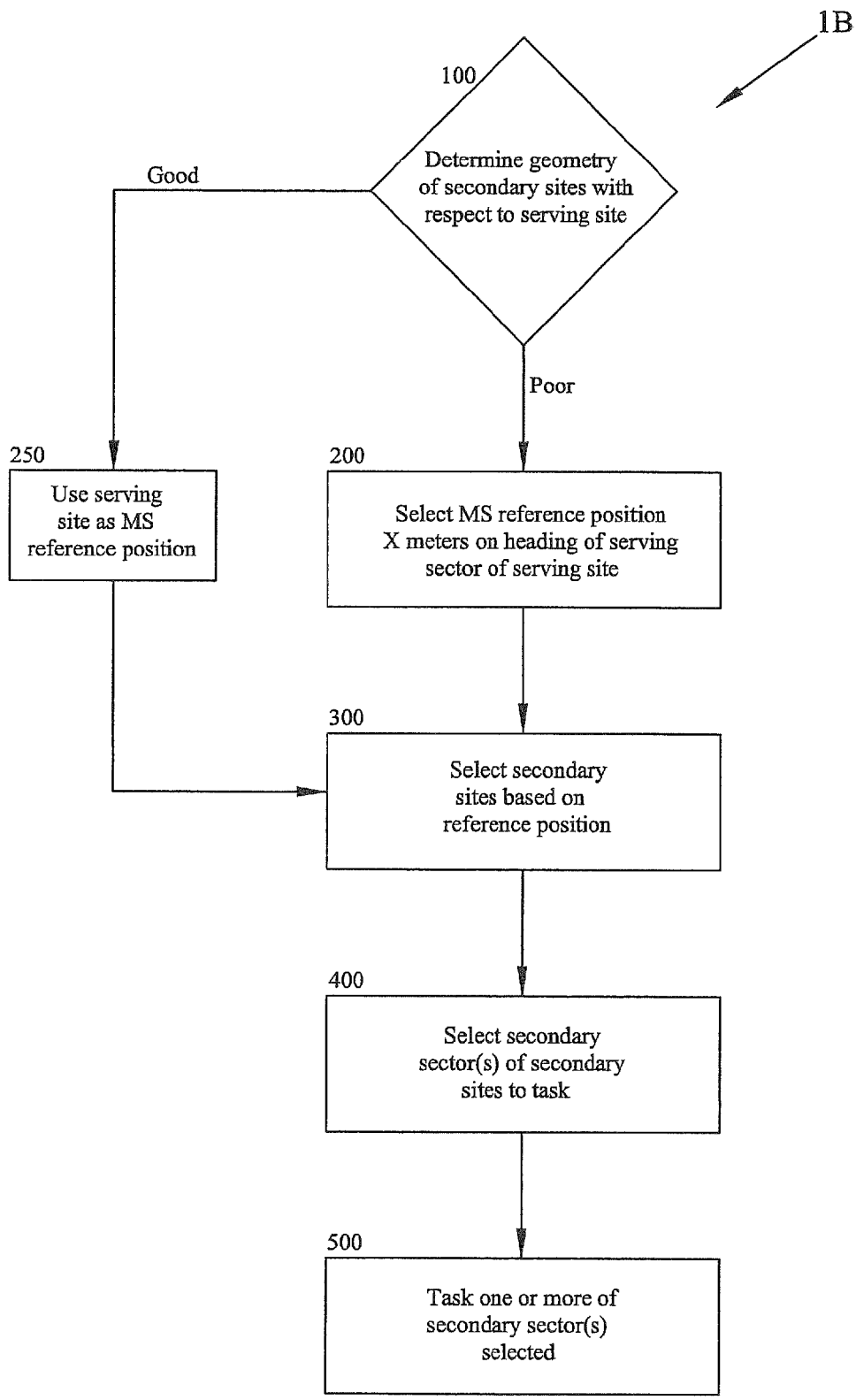
FIG. 8 illustrates a flow diagram of another process to geo-locate a MS.

FIG. 8 illustrates a flow diagram (1B) of another process to geo-locate a MS. An initial geometry determination may be performed by the GCS to determine whether to use the serving site location or a heading position of the serving site as the MS reference position (operation 100). If, for example, the secondary sites are located around the serving site then the geometry may be "Good". Conversely, if the secondary sites are not located around the serving site (i.e., the secondary sites share common X or Y-coordinates) then the geography may be "Poor". Once the reference position is determined (operation 200 or 250), one or more secondary sites can be selected based on their relative positions with respect to the reference position (operation 300). The sector(s) of the selected secondary sites may be selected (operation 400) and tasked to obtain and provide location information received from the MS (operation 500).

Figure 9:
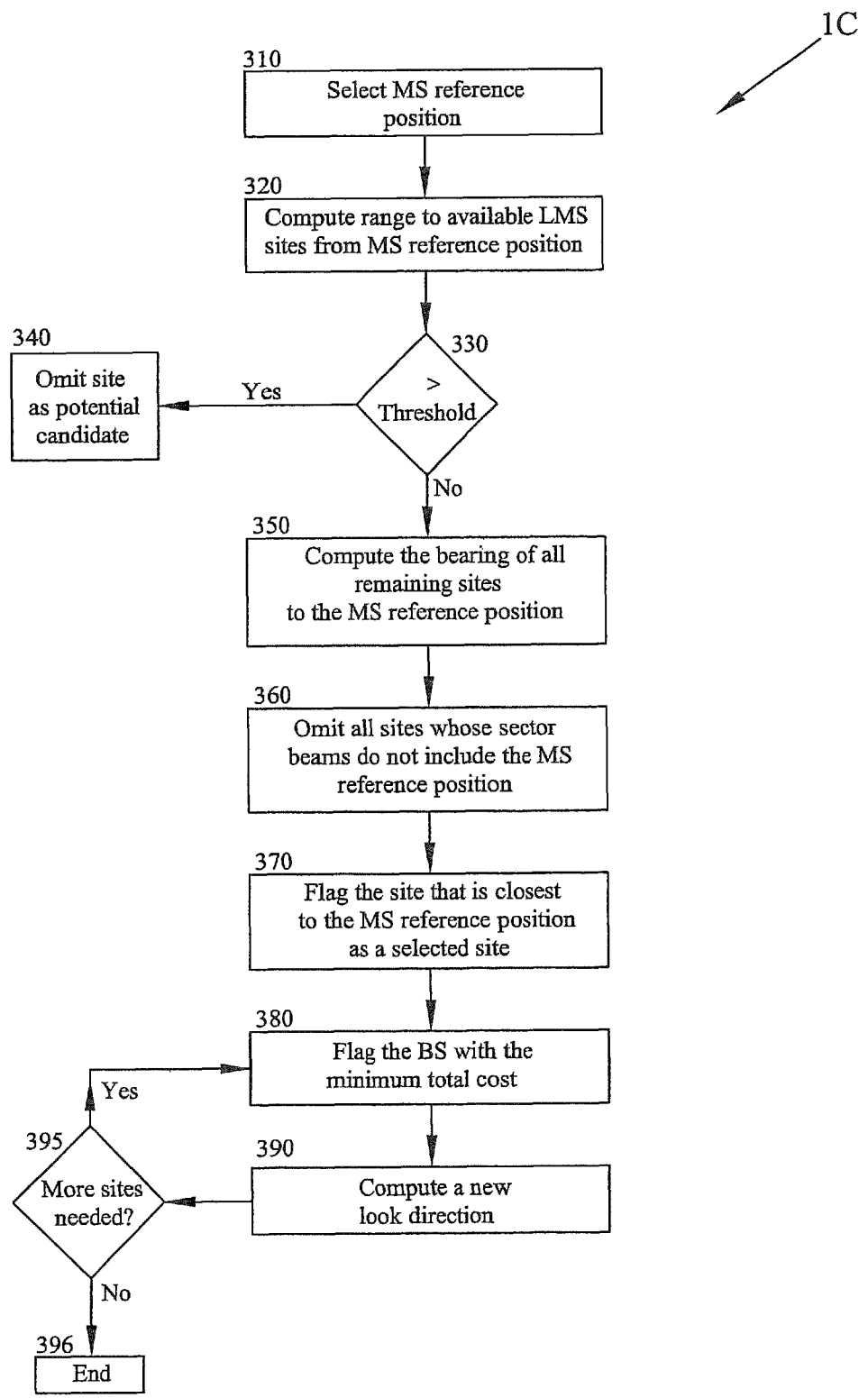
FIG. 9 illustrates a flow diagram of a process to select secondary sites.

FIG. 9 illustrates a flow diagram (1C) of a process to select secondary sites. First, a reference position is calculated to provide a location to use as a reference to select secondary sites (operation 310). A range may be computed to the available LMS sites from the MS reference position (operation 320). A threshold distance (operation 330) may be used to omit sites that are too far from the reference position (operation 340), and consider those sites that are within the distance range as potential secondary sites. A bearing angle may be calculated (operation 350) to determine which sites have sector beams that cover the area of the reference position. The sites that do not include the MS reference position may be omitted (operation 360). A proximity test may be administered to flag the site that is closest to the MS reference position (operation 370) so it will not to be included in subsequent selection operations. A minimum total cost function may be applied to determine and/or flag the site with the minimum total cost, as described in detail above (operation 380). After a site is flagged, a new look direction may be calculated which may replace the previous look direction (operation 390). The process of calculating a new look direction and computing a cost function is recursive and may be repeated until the necessary number of secondary sites needed have been selected or no candidates remain (operation 395). Once the number of needed secondary sites have been obtained, the process may end (operation 396).

Figure 10:
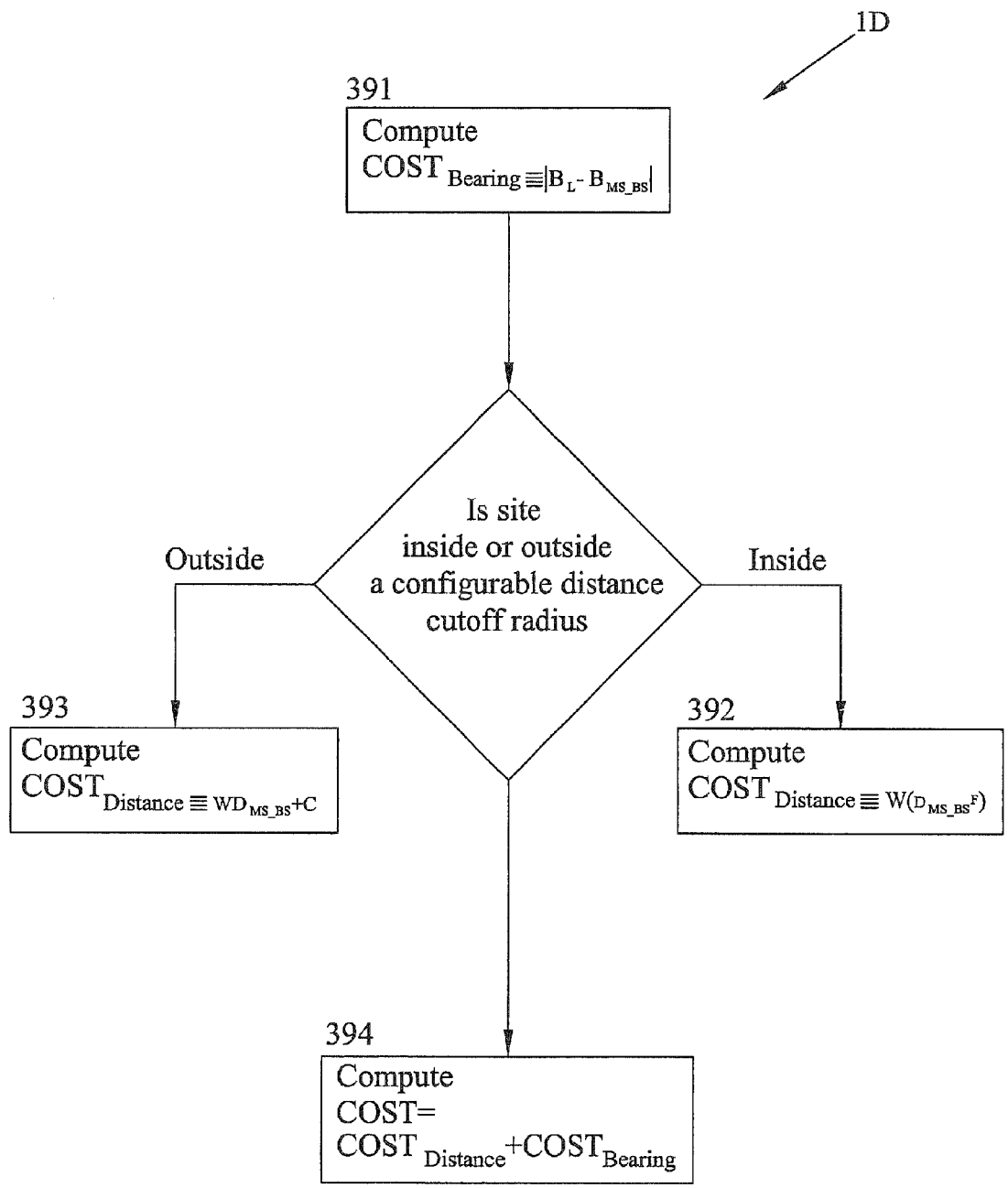
FIG. 10 illustrates a flow diagram of a process to calculate a cost function to select secondary sites.

FIG. 10 illustrates a flow diagram (1D) of a process to compute the cost function described in operation 390 of FIG. 9. A bearing cost is defined as the absolute value of the angular difference in degrees between the bearing angle from the MS reference position to the secondary site candidate and the look direction bearing angle (operation 391). The distance cost may be determined different ways depending on whether the candidate site is inside or outside a distance cutoff radius (operations 392 or 393). The cost function may be computed based on the determined bearing cost and the distance cost (operation 394).

The embodiments described above may be used in base station configurations that include, but are not limited to: predetermined data collected over varying terrain, different base station configurations, varying cellular communication protocols.

While preferred embodiments of the present invention have been described, it is to be understood that the embodiments described are illustrative only and the scope of the invention is to be defined solely by the appended claims when accorded a full range of equivalents, many variations and modifications naturally occurring to those skilled in the art from a perusal hereof.

What is claimed is:

1. A method of geo-locating a mobile station in a geographic area serviced by a plurality of base station sites co-located with location measurement units (LMUs), the method comprising:
   receiving a location request;
   determining a serving sector of a serving site;
   determining a reference position within the geographical area of the serving sector;
   selecting at least one secondary site to provide location information of the mobile station, the secondary site being selected based on its location with respect to the reference position;
   obtaining the location information from at least one measurement unit located within the at least one secondary site; and
   estimating the location of the mobile station based on the obtained location information,
   wherein the step of selecting at least one secondary site further comprises calculating a cost function to determine which secondary site has a minimum total cost and flagging that site as no longer considered an available candidate site.

2. A method of geo-locating a mobile station in a geographic area serviced by a plurality of base station sites co-located with location measurement units (LMUs), the method comprising:
   selecting a reference position within a communication coverage area of a of a first site;
   selecting at least one secondary site according to a function of the reference position;
   selecting at least one secondary sector of the at least one selected secondary site to task based on a function of the reference position; and
   tasking the at least one secondary sector to obtain location information of the mobile station,
   wherein the step of selecting at least one secondary site further comprises administering a proximity test to flag the site that is closest to the reference position so that site will not be considered an available candidate site.

3. The method of claim 2, wherein the reference position is the location of the first site.

4. The method of claim 2, wherein the reference position is determined according to a function of a heading position of the mobile station's serving sector, and is located within the geographical area of the serving sector of the first site.

5. The method of claim 2, wherein the reference position is determined to be a predetermined distance from the first site and in a serving sector of the first site, the predetermined distance based on a percentage of an average inter-site distance between two or more sites.

6. The method of claim 5, wherein the percentage of the average inter-site distance is approximately twenty percent.

7. The method of claim 2, wherein said method further comprises:
   determining a distance range to available secondary sites from the reference position; and
   omitting those secondary sites whose distance from the reference position exceeds a distance threshold.

8. The method of claim 2, wherein said method further comprises:
   determining the bearing angle from available secondary sites to the reference position; and
   omitting those secondary sites that do not include the reference position in any sectorized antenna beams.

9. The method of claim 2, wherein said method further comprises:
   determining which secondary site is closest to the reference position; and
   flagging that site so it is no longer considered an available candidate site.

10. The method of claim 2, wherein said method further comprises:
    calculating the estimated mobile station position using an AOA algorithm.

11. The method of claim 2, wherein said method further comprises:
    calculating the estimated mobile station position using a UTDOA algorithm.

12. A method of geo-locating a mobile station in a geographic area serviced by a plurality of base station sites co-located with location measurement units (LMUs), the method comprising:
    selecting a reference position within a communication coverage area of a first site;
    selecting at least one secondary site according to a function of the reference position;
    selecting at least one sector of the at least one selected secondary site to task based on the reference position; and
    tasking the at least one sector to obtain location information of the mobile station,
    wherein the step of selecting at least one secondary site further comprises calculating a cost function to determine which secondary site has a minimum total cost and flagging that site as no longer considered an available candidate site.

13. A mobile station geo-location system having a plurality of base station sites co-located with location measurement units (LMUs), the system comprising:

a first site designated as a serving site in communication with the mobile station;

at least one secondary site selected to provide location information of the mobile station, the at least one secondary site selected from a group of at least two secondary sites, and where the at least one selected secondary site produces at least one preferred parameter that the least one non-selected secondary site cannot produce, wherein the non-selected secondary site was not selected using a proximity test which flag the non-selected site as being closest to the mobile station.

14. The system of claim 13, wherein the preferred parameter is a shorter distance between the first site and the at least on secondary site.

15. The system of claim 13, wherein the preferred parameter is a shorter distance between a reference position, located within the communication coverage area of the first site, and the at least one secondary site.

16. The system of claim 13, wherein the preferred parameter is a predetermined distance range radius and the at least one selected site is inside the distance range radius and the at least one non-selected site is outside the distance range radius.

17. A method of geo-locating a MS in a geographic area serviced by a plurality of BS sites co-located with location measurement units (LMUs), and at least one geo-location control system (GCS) with a record of the mobile station's current serving BS site and respective current serving sector, the improvement comprising determining a reference position location of the mobile station within the current serving sector and based on the reference position, tasking a secondary base station site and/or sector of the secondary base station to provide location information of the mobile station, wherein the tasked secondary base station site was selected as a function of a cost function to determine which secondary site has a minimum total cost and flagging that site as no longer considered an available candidate site.

18. A method of geo-locating a mobile station in a geographic area serviced by a plurality of base station sites co-located with location measurement units (LMUs), the method comprising:

determining the locations of secondary base station sites with respect to a serving base station site location;

selecting a mobile station reference position based on the type of location arrangement of the secondary sites;

selecting at least one secondary site according to a function of the reference position by administering a proximity test to flag the site that is closest to the reference position so that site will not be considered an available candidate site;

selecting at least one secondary sector of the at least one selected secondary site to task based on a function of the reference position; and tasking the at least one secondary sector to obtain location information of the mobile station.

* * * * *